United States Patent
Lv

(10) Patent No.: US 7,927,051 B2
(45) Date of Patent: Apr. 19, 2011

(54) RIVET AND RIVETED STRUCTURE USING SAME

(75) Inventor: Li-Ying Lv, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 397 days.

(21) Appl. No.: 12/127,836

(22) Filed: May 28, 2008

(65) Prior Publication Data

US 2009/0196709 A1    Aug. 6, 2009

(30) Foreign Application Priority Data

Feb. 1, 2008   (CN) .......................... 2008 1 0300318

(51) Int. Cl.
*F16B 37/06* (2006.01)
(52) U.S. Cl. ........................................ 411/180; 411/501
(58) Field of Classification Search .................. 411/179, 411/180, 501
See application file for complete search history.

(56) References Cited

U.S. PATENT DOCUMENTS

| | | | | | |
|---|---|---|---|---|---|
| 3,125,146 | A | * | 3/1964 | Ernest | 411/180 |
| 3,133,579 | A | * | 5/1964 | Grimm et al. | 411/180 |
| 3,270,355 | A | * | 9/1966 | Tildesley | 470/20 |
| 3,443,617 | A | * | 5/1969 | Whiteside et al. | 411/180 |
| 3,556,189 | A | * | 1/1971 | Ernest | 411/189 |
| 3,736,969 | A | * | 6/1973 | Warn et al. | 411/179 |
| 3,820,579 | A | * | 6/1974 | Barry | 411/176 |
| 6,527,489 | B2 | * | 3/2003 | Kando | 411/107 |
| 2005/0084362 | A1 | * | 4/2005 | Nah, II | 411/180 |

FOREIGN PATENT DOCUMENTS

GB    941221 A    11/1963

* cited by examiner

*Primary Examiner* — Flemming Saether
(74) *Attorney, Agent, or Firm* — Zhigang Ma

(57) ABSTRACT

An exemplary rivet includes a main body, and a riveting portion extending from the main body. The riveting portion has a first flange, and a second flange nearer to the main body than the first flange. The first flange and the second flange cooperatively defines a receiving cavity. A distance between a side surface of a portion of the second flange and a center axis of the rivet is greater than the distance between a side surface of the first flange and the center axis of the rivet.

17 Claims, 3 Drawing Sheets

RIVET AND RIVETED STRUCTURE USING SAME

BACKGROUND OF THE INVENTION

1. Field of the Invention

The present invention generally relates to rivets, and particularly to structures using rivets.

2. Discussion of the Related Art

In recent years, there has been an increase in demand for electronic devices, such as computers, video compact disk (VCD) players, and digital video disk (DVD) players. In the majority of cases the housings of these electronic devices are made of a plurality of sheet-like elements.

Generally, the sheet-like elements are directly fixed or connected to each other by fasteners, such as screws. However, the sheet-like elements are mostly thin sheets, and threaded holes defined in the sheet-like elements are relatively thin or shallow. Consequently, the interacting area of the female threads of the sheet-like elements and the male threads of the screws in the threaded hole is limited. Therefore, joint strength between the sheet-like elements of the housing connected directly by the screws might be unduly low. In addition, the screw usually protrudes from the surface of the sheet-like elements. This may affect the appearance of the housing and may also be hazardous.

What is needed, therefore, is a rivet and a riveted structure using the rivet that can overcome the above-mentioned shortcomings.

SUMMARY

A rivet includes a main body, and a riveting portion extending from the main body. The riveting portion has a first flange, and a second flange nearer to the main body than the first flange. The first flange and the second flange cooperatively define a receiving cavity. A distance between a side surface of a portion of the second flange and a center axis of the rivet is greater than that the distance between a side surface of the first flange and the center axis of the rivet.

Other novel features will become more apparent from the following detailed description, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present rivet and riveted structure using the rivet. Moreover, in the drawings, like reference numerals designate corresponding parts throughout several views, and all the views are schematic.

DETAILED DESCRIPTION OF THE EMBODIMENTS

Reference will now be made to the drawings to describe exemplary embodiments of the present rivet and riveted structure in detail.

Figure 1:
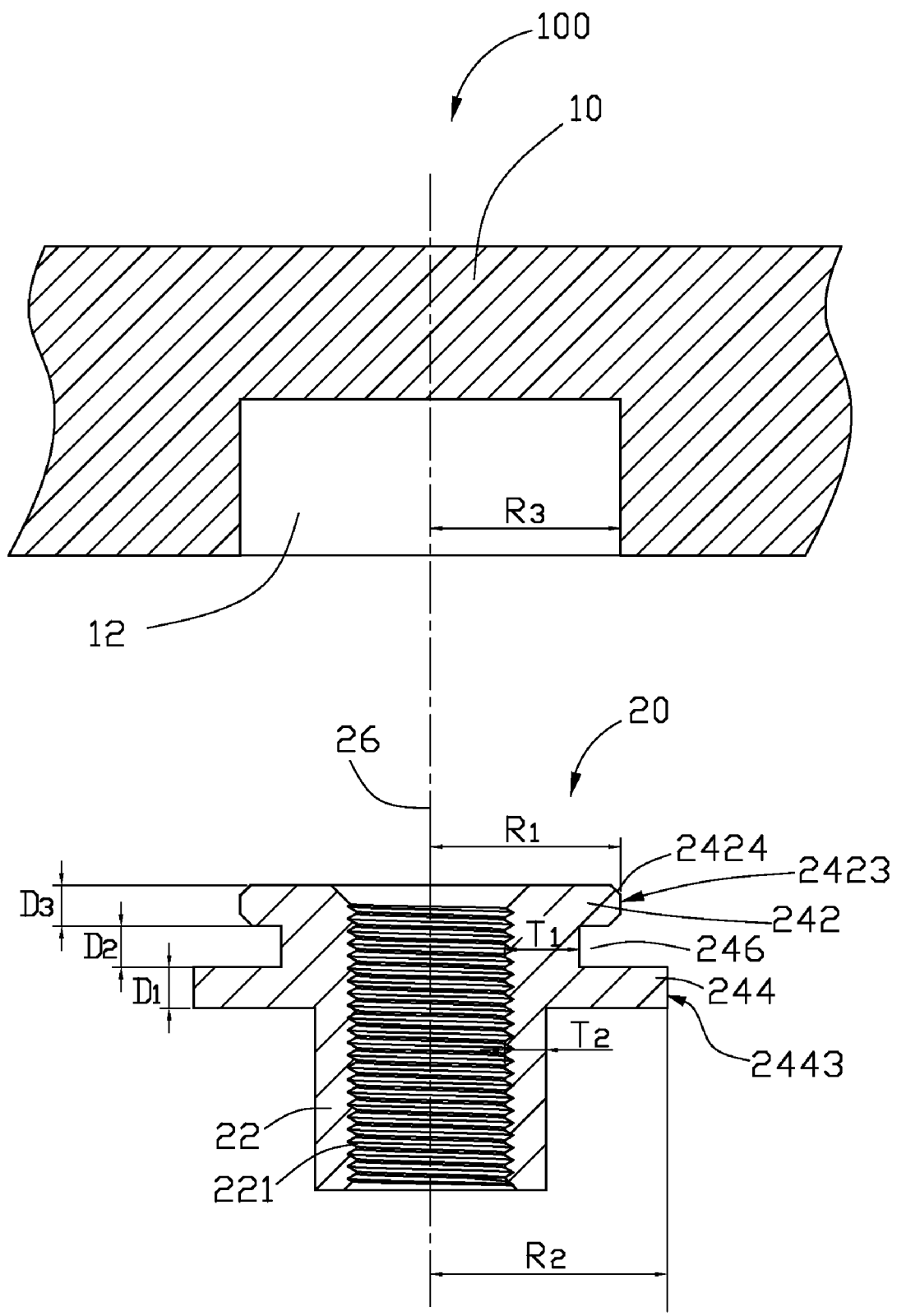
FIG. 1 is an exploded, side, cross-sectional view of a riveted structure in accordance with an exemplary embodiment of the present invention.
Figure 2:
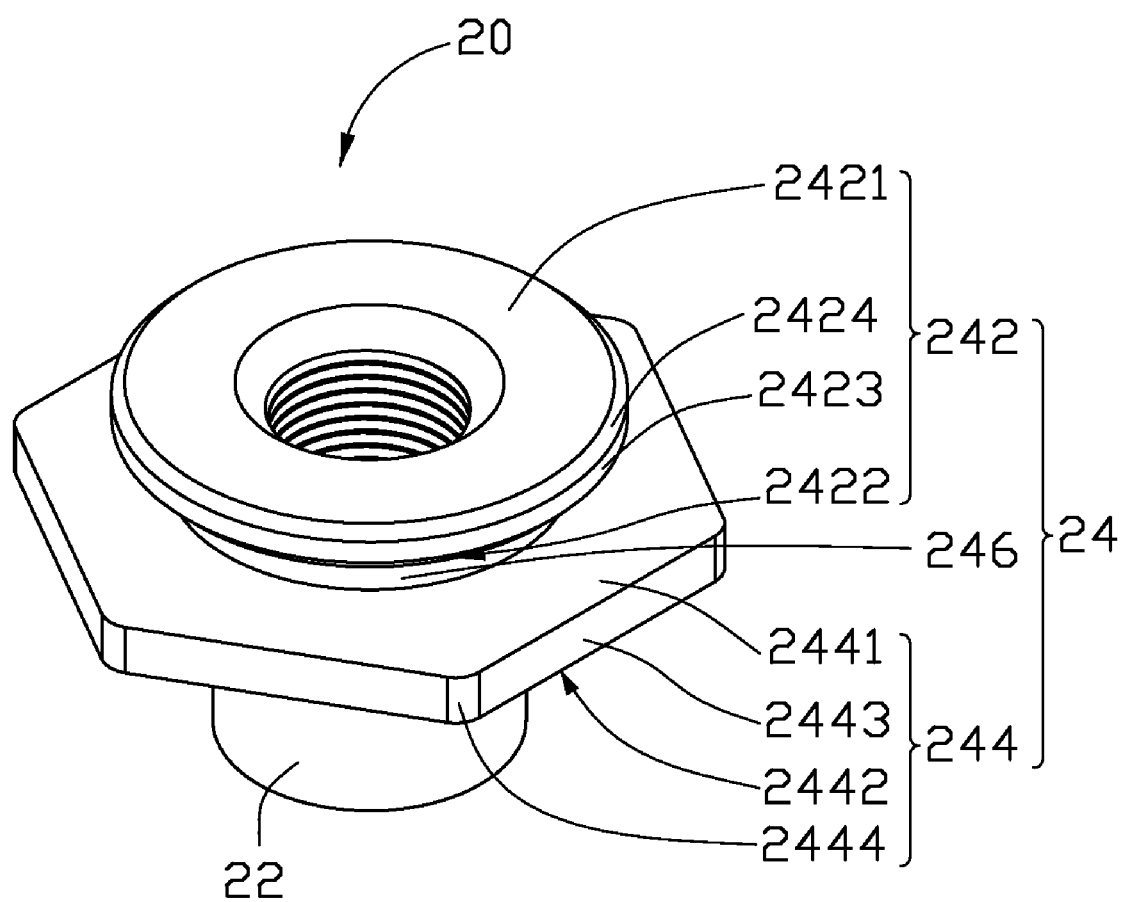
FIG. 2 is an isometric view of a rivet of the riveted structure of FIG. 1.

Referring to FIGS. 1 and 2, a riveted structure 100 according to an exemplary embodiment is shown. The riveted structure 100 includes a workpiece 10, and a rivet 20 assembled with the workpiece 10.

The workpiece 10 is a sheet-like element of a housing of a computer for exemplary purposes. A thickness of the workpiece 10 is equal to or less than 2 millimeters. A rigidity of the workpiece 10 is less than that of the rivet 20. The workpiece 10 defines a riveting hole 12. In this embodiment, the riveting hole 12 is a blind hole.

The rivet 20 includes a main body 22, and a riveting portion 24 extending from one end of the main body 22. The riveting portion 24 may be engaged in the riveting hole 12.

The main body 22 is columnar. The main body 22 defines a threaded hole 211 therein. The threaded hole 211 runs through the main body 22 and the riveting portion 24. A minimum thickness $T_1$ of a sidewall of the riveting portion 24 is greater than a thickness $T_2$ of the main body 22.

The riveting portion 24 includes a first flange 242, and a second flange 244. The first flange 242 is located on an end of the riveting portion 24. The second flange 244 is nearer to the main body 22 relative to the first flange 242. The first flange 242 includes a top surface 2421, a bottom surface 2422, a columnar side surface 2423, and two first chamfers 2424. The first chamfers 2424 are respectively connected the top surface 2421 and the columnar side surface 2423, and connected the bottom surface 2422 and the columnar side surface 2423. The second flange 244 is substantially a hexagonal column in shape. The second flange 244 includes an upper surface 2441, a lower surface 2442, a plurality of rectangular side surfaces 2443, and a plurality of second chamfers 2444. The rectangular side surfaces 2443 connect with the upper surface 2441 and the lower surface 2442. The second chamfers 2444 connect adjacent rectangular side surfaces 2443 respectively. The first flange 242 and the second flange 244 cooperatively define a receiving cavity 246. $R_1$ represents a distance from the columnar side surface 2423 of the first flange 242 to a center axis 26 of the rivet 20. $R_2$ represents a distance from the rectangular side surface 2443 of the second flange 244 to the center axis 26 of the rivet 20. $R_3$ represents a radius of the riveting hole 12. Sizes of the workpiece 10 satisfy the following expression: $R_3 \leq R_1 < R_2$. $D_1$ represents a thickness of the second flange 244. $D_2$ represents a distance between the first flange 242 and the second flange 244. $D_3$ represents a thickness of the first flange 242. $D_1$, $D_2$, and $D_3$ are configured according to a material of the workpiece 10. To prevent the riveting portion 24 from deformation and/or fracture, preferably, $D_1$ is equal to or greater than 0.25 millimeters, $D_2$ is equal to or greater than 0.25 millimeters, and $D_3$ is equal to or greater than 0.3 millimeters.

Figure 3:
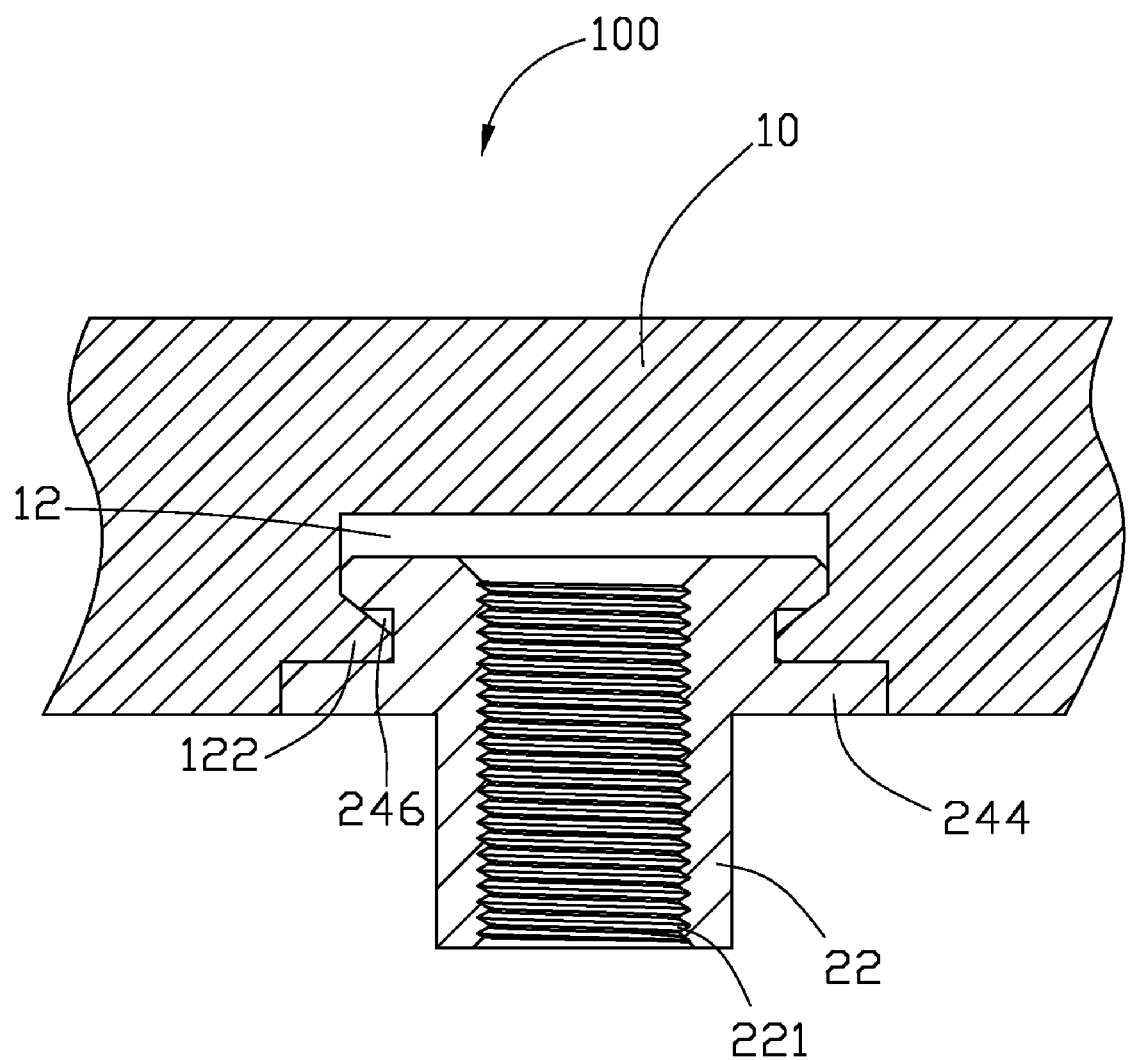
FIG. 3 is an assembled, side, cross-sectional view of the riveted structure of FIG. 1.

Referring to FIG. 3, in the riveted structure 100, because the main body 22 of the rivet 20 defines a threaded hole 211 therein, a length of a screw thread in the riveted structure 100 is increased. Therefore, an interacting area between the riveted structure 100 and a male thread of a screw (not shown) may be increased so as to enhance joint strength between the riveted structure 100 and an element fixed by the screw. In addition, while the rivet 20 is riveted in the workpiece 10, deformable portions 122 of the workpiece 10 that may be deformed in the riveting process can be received in the receiving cavity 246, thereby preventing the deformable materials 122 of the workpiece 10 from pushing against and deforming a sidewall of the riveting hole 12. Therefore, there are no protrusions formed on a surface of the workpiece 10, and thus preserving the desired appearance of the riveted structure 100.

In addition, while the rivet 20 is riveted in the workpiece 10, the first chamfers 2424 and the second chamfers 2444 may facilitate and/or guide the deformable portions 122 of the workpiece 10 to uniformly extend into the receiving cavity 246. Furthermore, because the second flange 244 is substantially a hexagonal column in shape, the rivet 20 rigidly and stably combines with the workpiece 10, thereby preventing the rivet 20 from being rotated relative to the workpiece 10.

It is noted that the scope of the present rivet and riveted structure is not limited to the embodiments described above. For example, the distance $D_2$ between the rectangular side surfaces 2443 of only a portion of the second flange 244 and the center axis 26 may be greater than the distance $D_1$ between columnar side surface 2423 of the first flange 242 and a center axis 26. The threaded hole 211 of the main body 22 can be a blind hole. The second flange 244 can be substantially an octagonal column in shape. The riveting hole 12 of the workpiece 10 can be through hole. In addition, the receiving cavity 246 may just receive a portion of the deforming materials 122.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A rivet comprising:
   a main body, and
   a riveting portion extending from the main body, the riveting portion having a first flange, and a second flange nearer to the main body than the first flange,
   wherein the first flange and the second flange define a receiving cavity, a distance between a side surface of at least a portion of the second flange and a center axis of the rivet is greater than the distance between a side surface of the first flange and the center axis of the rivet, and the first flange comprises a top surface, a bottom surface, a side surface, and a plurality of chamfers connecting with the top surface and the side surface, and connecting with the bottom surface and the side surface.

2. The rivet as claimed in claim 1, wherein the second flange is a hexagonal column or an octagonal column in shape.

3. The rivet as claimed in claim 1, wherein the second flange comprises a plurality of side surfaces, and a plurality of chamfers connecting with adjacent side surfaces.

4. The rivet as claimed in claim 1, wherein a thickness of the first flange is equal to or greater than 0.3 millimeters.

5. The rivet as claimed in claim 1, wherein a thickness of the second flange is equal to or greater than 0.25 millimeters.

6. The rivet as claimed in claim 1, wherein a distance between the first flange and the second flange is equal to or greater than 0.25 millimeters.

7. The rivet as claimed in claim 1, wherein the main body further defines a hole therein.

8. The rivet as claimed in claim 7, wherein the hole runs through the main body and the riveting portion, and a minimum thickness of a sidewall of the riveting portion is greater than a thickness of the main body.

9. A riveted structure comprising:
   a workpiece defining a riveting hole therein, and
   a rivet comprising:
      a main body, and
      a riveting portion extending from the main body and engaging in the riveting hole, the riveting portion having a first flange, and a second flange nearer to the main body than the first flange,
   wherein the first flange and the second flange define a receiving cavity for receiving at least a portion of deformable materials of the workpiece, a distance between a side surface of at least a portion of the second flange and a center axis of the rivet is greater than the distance between a side surface of the first flange and the center axis of the rivet, and the first flange comprises a top surface, a bottom surface, a side surface, and a plurality of chamfers connecting with the top surface and the side surface, and connecting with the bottom surface and the side surface.

10. The riveted structure as claimed in claim 9, wherein the riveting hole is a blind hole.

11. The riveted structure as claimed in claim 9, wherein the second flange is a hexagonal column or an octagonal column in shape.

12. The riveted structure as claimed in claim 9, wherein the second flange comprises a plurality of side surfaces, and a plurality of chamfers connecting with adjacent side surfaces.

13. The riveted structure as claimed in claim 9, wherein a thickness of the first flange is equal to or greater than 0.3 millimeters.

14. The riveted structure as claimed in claim 9, wherein a thickness of the second flange is equal to or greater than 0.25 millimeters.

15. The riveted structure as claimed in claim 9, wherein a distance between the first flange and the second flange is equal to or greater than 0.25 millimeters.

16. The riveted structure as claimed in claim 9, wherein the main body further defines a hole therein.

17. The riveted structure as claimed in claim 16, wherein the hole runs through the main body and the riveting portion, and a minimum thickness of a sidewall of the riveting portion is greater than a thickness of the main body.

* * * * *